United States Patent [19]

Hori et al.

[11] Patent Number: 4,965,675
[45] Date of Patent: Oct. 23, 1990

[54] METHOD AND APPARATUS FOR AFTER-RECORDING SOUND ON A MEDIUM HAVING PRE-RECORDED VIDEO THEREON

[75] Inventors: Masashi Hori; Shigeo Yamagata, both of Kanagawa, Japan

[73] Assignee: Canon Kabushiki Kaisha, Tokyo, Japan

[21] Appl. No.: 193,369

[22] Filed: May 12, 1988

[30] Foreign Application Priority Data

May 15, 1987 [JP] Japan .................. 62-119303
Jul. 31, 1987 [JP] Japan .................. 62-191871
Jul. 31, 1987 [JP] Japan .................. 62-191872

[51] Int. Cl.⁵ .................. H04N 5/76; H04N 5/781
[52] U.S. Cl. .................. 358/341; 360/19.1
[58] Field of Search .......... 358/335, 341, 343, 906, 358/909; 360/8, 9.1, 10.1, 19.1, 35.1

[56] References Cited

U.S. PATENT DOCUMENTS

| | | | |
|---|---|---|---|
| 4,009,331 | 2/1977 | Goldmark et al. | 360/19.1 |
| 4,499,503 | 2/1985 | Suzuki | 358/341 X |
| 4,602,296 | 7/1986 | Murahoshi | 358/341 X |
| 4,725,897 | 2/1988 | Konishi | 360/35.1 X |
| 4,794,465 | 12/1988 | Van Luyt | 358/341 |

Primary Examiner—Robert L. Richardson
Attorney, Agent, or Firm—Robin, Blecker, Daley & Driscoll

[57] ABSTRACT

A recording apparatus for recording audio signals and video signals on a recording medium in a mixed form is disclosed. The recording apparatus has a device for reproducing video signals which correspond to audio signals to be recorded prior to the execution of recording of the audio signals. Therefore, an operator can perform sound recording while confirming a correspondence between an image and the sound, since the image associated with the sound is reproduced as a visual image.

19 Claims, 11 Drawing Sheets

FIG.11

| M (MEMORY ADDRESS) | CONTENT |
|---|---|
| 0 | TRACK ADDRESS |
| 1 | " |
| 2 | " |
| 3 | " |
| ⋮ | ⋮ |
| M | " |
| M+1 | " |
| ⋮ | ⋮ |

METHOD AND APPARATUS FOR AFTER-RECORDING SOUND ON A MEDIUM HAVING PRE-RECORDED VIDEO THEREON

BACKGROUND OF THE INVENTION

1. Field of the Invention

The present invention relates to a method of and an apparatus for recording new information in addition to information which has previously been stored in a storage means.

2. Description of the Related Art

It is known that a typical example of such an apparatus is incorporated in electronic equipment such as a video tape recorder and functions to after-record audio signals with respect to video signals previously recorded on a recording medium.

In recent years, a unified standard for still video systems capable of recording still image signals and audio signals on video floppy disks has been published, and various products in accord with the unified standard have been developed.

The unified still video standard states that, in sound recording, audio signals as well as control codes are recorded on a video floppy disk, and information required for recording and reproduction of audio signals is written as the control codes, the control codes further including information for providing a particular correspondence between sound and an image. When the sound recorded on a particular track on the video floppy disk is to be reproduced, that information makes it possible to display on a monitor a still image that corresponds to the sound.

In such an apparatus, if it is desired to record audio signals which are to be reproduced together with video signals which have previously been recorded, there is no need for a special positional relationship between an area in which the video signals have been recorded and an area in which the audio signals corresponding to the video signals are to be recorded, for example, the condition that both of the areas must be close to each other is not needed. For this reason, while audio signals are being recorded, a recording/reproducing head is not necessarily accessing the area in which the corresponding video signals are recorded. This leads to the problem that an operator cannot confirm which of the images recorded on the tracks corresponds to the sound desired to be recorded.

The above description refers to typical problems with the standardized still video techniques which are to be solved by the present invention. However, such problems are not involved in the still video techniques only.

The problem that information recorded previously is difficult to confirm when additional information is to be recorded is likewise encountered in systems of any type in which there is no restriction upon the positional relationship between an area in which information has previously been recorded and an area in which additional information is to be recorded in association with the former information.

SUMMARY OF THE INVENTION

It is, therefore, a first object of the present invention to solve the above-described problems.

To achieve the first object, the present invention provides a recording apparatus and a recording method by means of which it is possible to positively confirm information stored in a storage means when additional information is to be stored in an area independent of the area of the stored information but in association therewith.

In accordance with one embodiment intended for achieving the first object, a recording apparatus is provided for recording audio signals and video signals on a recording medium in a mixed form, the recording apparatus being provided with means for reproducing video signals which correspond to audio signals to be recorded prior to recording of the audio signals. Therefore, an operator can perform sound recording while confirming that there is a correspondence between an image and the sound by causing the image associated with the sound to be reproduced.

It is a second object of the present invention to provide a recording apparatus by means of which it is possible to after-record audio signals in a simple way and with good operability in correspondence with video signals which define a plurality of images associated with the audio signals.

It is a third object of the present invention to provide a recording apparatus which enables efficient use of the recording area on a recording medium in after-recording audio signals in correspondence with video signals.

In accordance with another embodiment intended for achieving the third object, a recording apparatus is provided which comprises means for reproducing video signals recorded on video signal tracks on a recording medium, the recording medium having a plurality of tracks on which video signals and audio signals can be recorded in a mixed form; means for recording audio signals on empty tracks on the recording medium; track switching means for changing the video signal tracks to be reproduced in accordance with the passage of the recording period for the audio signals, whereby it is ensured that recording and reproduction can be performed with the switching operation of video signals exactly corresponding to that of audio signals so that the timing of the video signals can be made exactly coincident with that of the audio signals.

It is a fourth object of the present invention to provide a recording apparatus by means of which it is possible to after-record audio signals of desired duration in association with video signals which are contained in a plurality of recorded images.

It is a fifth object of the present invention to provide a recording apparatus by means of which it is possible to after-record audio signals in association with video signals recorded previously and in accord with the still video standard.

The above and other objects, features and advantages of the present invention will become apparent from the following description of the preferred embodiments thereof, taken in conjunction with the accompanying drawings.

BRIEF DESCRIPTION OF THE DRAWINGS

FIG. 11 is a view illustrating the structure of a memory for storing the track addresses of video signal tracks in the second embodiment;

DETAILED DESCRIPTION OF THE PREFERRED EMBODIMENTS

Preferred embodiments of the present invention will be described below with reference to the accompanying drawings.

Figure 1:
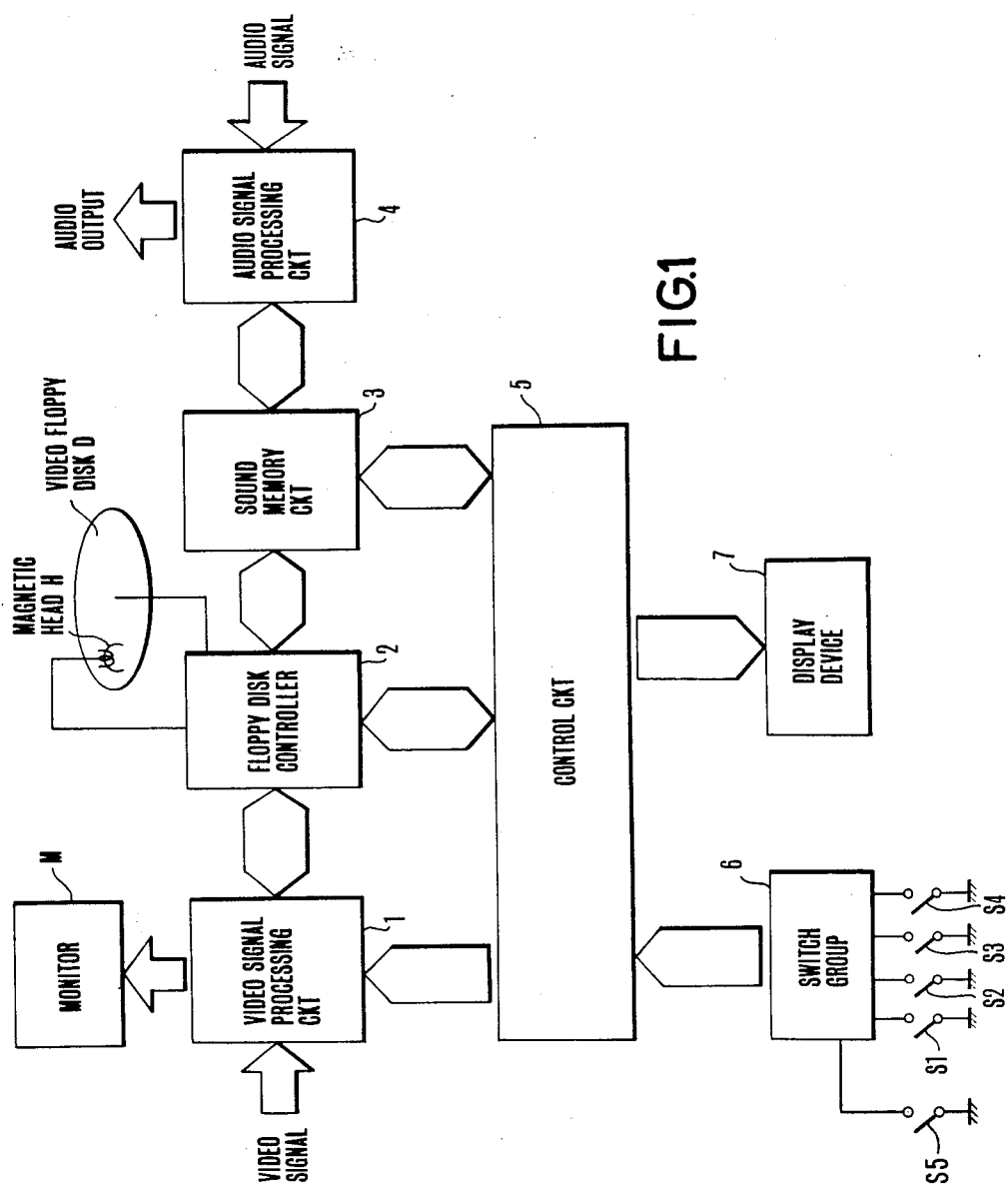
FIG. 1 is a block diagram showing the construction of a recording apparatus according to a first embodiment of the present invention.

FIG. 1 shows the diagrammatic construction of a recording apparatus according to a first preferred embodiment of the present invention. As illustrated, the recording apparatus comprises a monitor M; a video signal processing circuit 1; a floppy disk controller (hereinafter referred to as "FDC") 2, the video signal processing circuit 1 serving to receive video signals supplied from an external video signal source (not shown) and output corresponding video output signals to the monitor M, as well as to operate the floppy disk controller 2 to record a corresponding still image on a video floppy disk D; a sound memory circuit 3; an audio signal processing circuit 4; a control circuit 5; the sound memory circuit 3 arranged to store therein audio signals input to the audio signal processing circuit 4 while sampling them at the time-axis compression ratio specified by the control circuit 5, and to output stored audio signals to the audio signal processing circuit 4 while expanding the time axis of the stored audio signals on the basis of the time-axis compression ratio specified by the control circuit 5 to provide audio reproduction of the stored audio signals, as well as to effect recording and reproduction of the audio signals on and from the video floppy disk D through the FDC 2; a magnetic head H; a switch group 6 operated to supply instructions representative of recording, reproduction and the like; and a display device 7 for providing visual display of the state of the recording apparatus, the display device 7 having a display portion on which the presence or absence of an empty track is displayed. The aforesaid switch group 6 includes a head movement switch S1 for issuing instructions for a change in the access position of the head H with respect to the video floppy disk D, a switch S2 for issuing instructions for execution of recording on the video floppy disk D with no empty tracks, a switch S3 for issuing an instruction for execution of after recording, a switch S4 for issuing an instruction for determining whether reproduction or recording is performed with respect to the video floppy disk D, and a switch S5 for issuing an instruction to designate a track on which are recorded video signals representing an image with respect to which it is desired to after-record the corresponding sound and for issuing an instruction for the starting and stopping of the storing of audio signals. The control circuit 5 is arranged to provide control over each of the circuits of the embodiment having the above-described arrangement.

Figure 2:
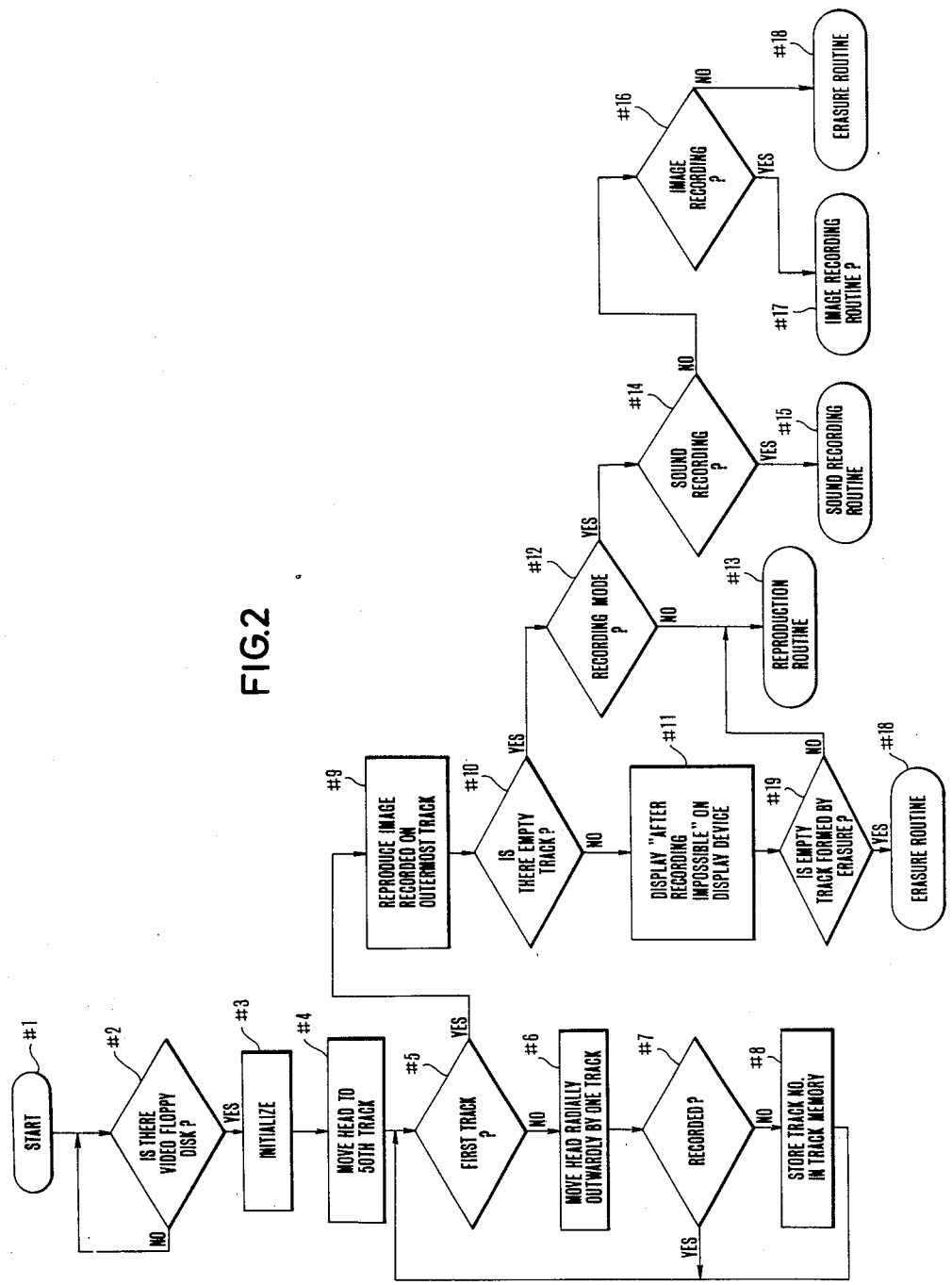
FIG. 2 is a flow chart illustrating the main routine executed in a recording method according to the present invention.

FIG. 2 is a main flow chart illustrating the operation of the control circuit 5 according to the first embodiment.

In the illustrated flow chart, Step #1 represents the start of the flow. In Step #2, the FDC 2 determines the presence or absence of the video floppy disk D. If it is determined that the video floppy disk D is absent, Step #2 is repeated and the process waits for the video floppy disk D to be placed in position. If it is determined that the video floppy disk D is present, the process proceeds to Step #3. The initialization required for the construction shown in FIG. 1 is performed in Step #3. In Step #4, the FDC 2 causes the magnetic head H to move to the 50th track on the video floppy disk D. In Step #5, judgment is made with respect to whether or not the track accessed by the magnetic head H is the first track. If it is determined that it is not the first track, the process proceeds to Step #6. If it is determined that it is the first track, the process proceeds to Step #9. In Step #6, the access position of the magnetic head H is moved radially outwardly by one track. In Step #7, judgment is made with respect to whether or not any signals are recorded on the track which has been accessed by the magnetic head H. If the track is a recorded track, the process returns to Step #5, while if it is a non-recorded track, the process proceeds to Step #8. In Step #8, the track number of the non-recorded (empty) track accessed by the magnetic head H is stored in a memory area in the control circuit 5 shown in FIG. 1. The memory area for storing empty track numbers is hereinafter referred to simply as "track memory area".

After a search from the 50th to the first tracks, the process proceeds to Step #9 in which an image recorded on the outermost track is reproduced and output to the monitor M by the video signal processing circuit 1 shown in FIG. 1. In Step #10, the presence or absence of empty tracks on the video floppy disk D is determined on the basis of whether or not track numbers which are not stored in the track memory area are stored on the video floppy disk D. If no empty track is present, the process proceeds to Step #11, while if an empty track is present, the process proceeds to Step #12. In Step #11, the display device 7 shown in FIG. 1 provides a visual display indicating that it is impossible to after-record any sound if there is no empty track.

The process proceeds to Step #19 in which the switch group 6 of FIG. 1 issues an instruction to determine whether or not after recording is enabled by forming an empty track on the video floppy disk D having no empty track. If formation of an empty track is desired, the process proceeds to the erasure routine of Step #18, while if formation of an empty track is not desired, the process proceeds to the reproduction routine of Step #13.

If it is determined in Step #10 that there is an empty track, the process proceeds to Step 12, in which the switch group 6 of FIG. 1 issues an instruction to determine whether recording or reproduction is to be performed with the video floppy disk D. If reproduction is selected, the process proceeds to the reproduction routine of Step #13; if recording is selected, the process proceeds to Step #14. In Step #14, the switch group S6 of FIG. 1 issues an instruction to determine whether or not sound is recorded on the detected empty track on the video floppy disk D. If the recording of any sound is desired, the process proceeds to the sound recording routine of Step #15. If no sound recording is selected, the process proceeds to Step #16. In Step #16, judgment is made with respect to whether or not image recording is to be performed. If image recording is selected, the process proceeds to the image recording routine of Step #17; if no image recording is selected, the process proceeds to the erasure routine of Step #18.

In the main flow chart shown in FIG. 2, if it is determined in Step #10 that there is no empty track, the display device 7 shown in FIG. 1 provides a display which warns an operator that the after recording of sound is impossible. Subsequently, the process proceeds to the erasure routine in order to form an empty track or to the reproduction routine in order to inhibit the execution of a recording command. With this arrangement, it is possible to prevent the operator from mistakenly after-recording a sound on the video floppy disk D containing no empty track or erasing video or audio signals which have previously been recorded on it.

Figure 3:
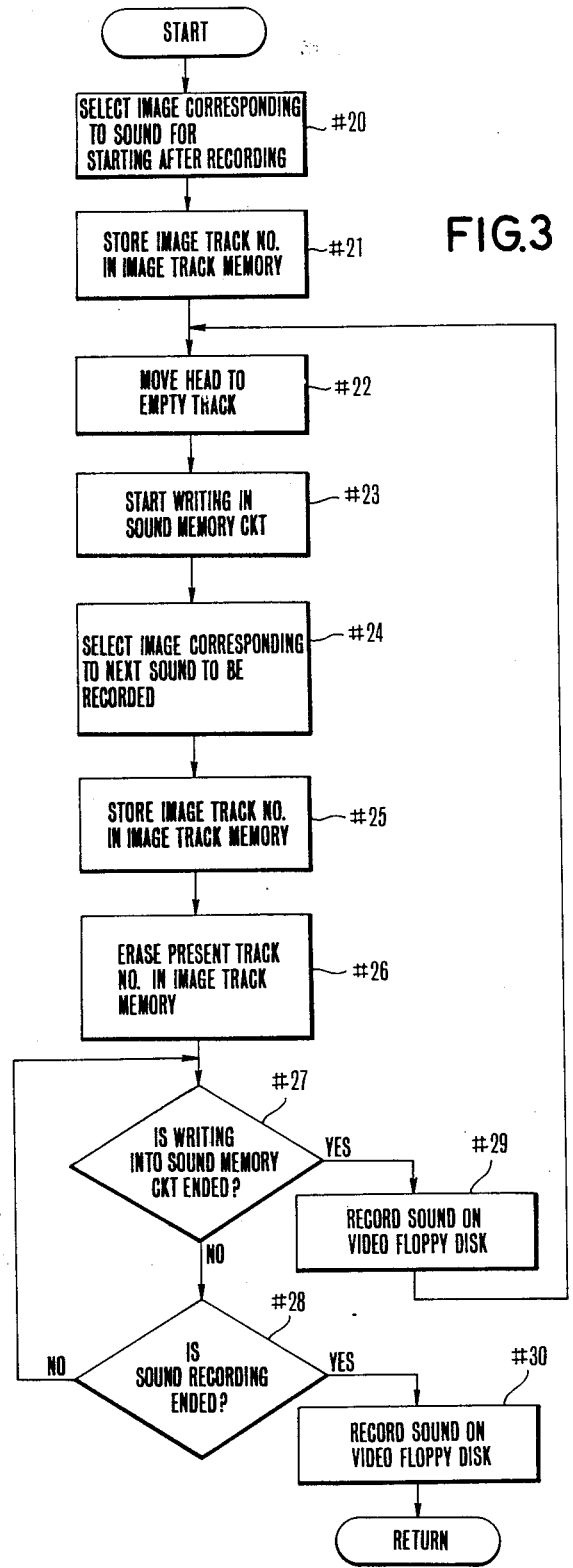
FIG. 3 is a flow chart illustrating a subroutine for sound recording.

FIG. 3 illustrates Step #15, shown in FIG. 2, that is, the sound recording routine for executing the after recording of a sound. In Step #20, the magnetic head H is moved to a track indicated by the track number of an initial single image with respect to which it is desired to after-record the corresponding sound and which track number is input through the switch group 6 shown in FIG. 1. Thus, the image is reproduced, that is, video signals with respect to which after recording is desired are reproduced as a visual image on the monitor M. In Step #21, the track number of the image thus reproduced is stored in a memory area in the control circuit 5. (The memory area for recording track numbers of images is hereinafter referred to as an "image track memory area".) In Step #22, the position of the magnetic head H is moved to an empty track corresponding to one of the empty track numbers which have been written into the track memory area in Step #8 shown in FIG. 2. In this case, it is desirable that the track number of a selected empty track be as close as possible to the track number written into the image track memory area. In Step #23, the storing of audio signals input to the audio signal processing circuit 4 in the sound memory circuit 3 is begun. If the sound which is presently being recorded exceeds the amount of information for one track, the remaining sound must be recorded on at least one more track. Therefore, in Step #24, an image which corresponds to the sound to be recorded on the next track is selected. The thus-selected image track number is input through the switch group 6 shown in FIG. 1, and the magnetic head H is moved to the selected image track, thus reproducing the corresponding image. In Step #25, the image track number selected in Step #24 is stored in the image track memory area. In Step #26, the track number of the track against which the magnetic head H is presently positioned is erased from the track memory area. Since the track against which the magnetic head H is presently positioned is a track on which a sound is to be recorded, the track is no longer an empty track when recording on the track is completed. Therefore, as described above, the track number of the corresponding empty track is erased from the track memory area for storing the track numbers of empty tracks.

Then, the process proceeds to Step #27 in which judgment is made with respect to whether or not the amount of information in the audio signal which is presently being stored in the sound memory circuit 3 has reached the maximum amount of information which can be stored on a single track. If the maximum amount of information for one track has not yet been reached, the process proceeds to Step #28; if it has been reached, the process proceeds to Step #29. In Step #28, the process waits for the switch group 6 to issue an instruction to stop sound-recording. If the instruction to stop recording is not input, the process proceeds to Step #27; if the instruction is input, the process proceeds to Step #30 in which the audio signals which have not yet reached the maximum amount of information for one track are recorded on the video floppy disk D. Subsequently, the process returns to the main routine. If the audio signals which are presently being recorded on the sound memory circuit 3 reaches the maximum amount of information for one track, the process proceeds to Step #29 in which the audio signals stored in the sound memory circuit 3 are recorded on the video floppy disk D. After the audio signals have been recorded on one track, the process returns from Step #29 to Step #22.

As shown in FIG. 3, the storing of audio signals in the sound memory circuit 3 is started in Step #23, and the track number of the video signals that correspond to the next sound to be recorded is input and stored in the image track memory area before the amount of information in the audio signals being stored in the sound memory circuit 3 reaches the maximum amount of information for one track. With this arrangement, it is possible to eliminate the problem that, when audio signals having the amount of information equivalent to a plurality of tracks are to be after-recorded, continuous recording of the sound cannot be performed since, after audio signals equivalent to one track have been recorded, an image track which corresponds to a sound to be recorded on the next track must be selected and recording of the sound must be restarted. Therefore, the present arrangement enables continuous after recording of audio signals having the amount of the information equivalent to a plurality of tracks.

In addition, since an image which corresponds to the sound to be after-recorded is displayed on the monitor M in Steps #20 and #24, an operator can readily understand the correspondence between the desired image and the sound which is being recorded.

It will be appreciated from the foregoing that, in accordance with the present invention, while audio signals are being recorded, video signals are reproduced from the corresponding image track whereby the correspondence between the sound and the image can be readily understood to improve operability.

Figure 4:
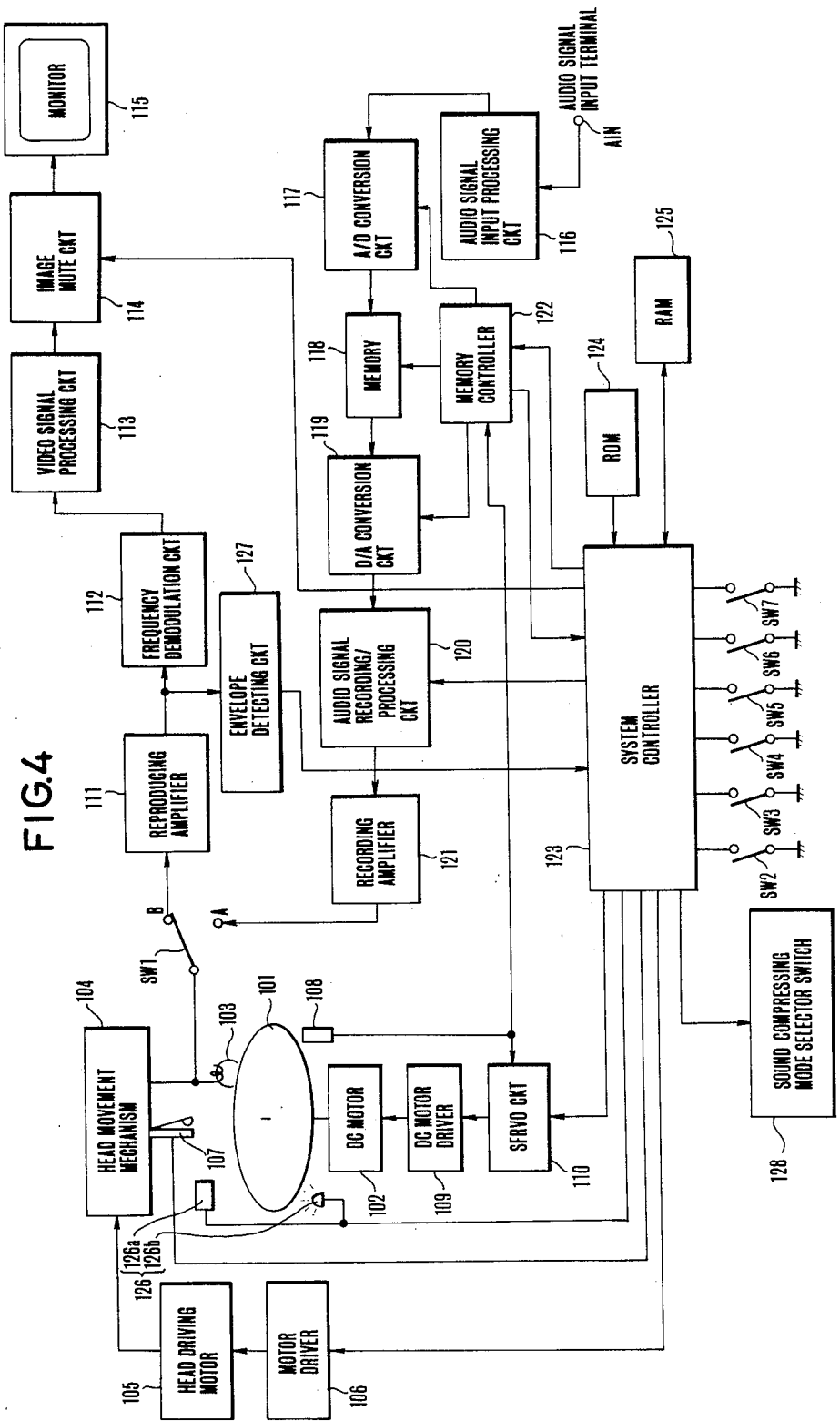
FIG. 4 is a block diagram showing the construction of a recording and reproducing apparatus according to a second embodiment of the present invention.

The following is a description, referring to FIG. 4, of a second preferred embodiment which is an applied form of the first embodiment and which has new functions in addition to those of the first embodiment.

FIG. 4 is a block diagram illustrating the construction of the second embodiment.

The illustrated second embodiment includes a magnetic disk 101; a DC motor 102 for rotating the magnetic disk 101 at a fixed speed; a head movement mechanism 104 for moving the magnetic head 103 over the magnetic disk 101 in the radial direction thereof, that is, in the direction transverse to tracks which are formed concentrically on the magnetic disk 101; a head driving motor 105 for driving the head movement mechanism 104; a motor driver 106 for driving the head driving motor 105; an innermost track detecting switch 107 arranged to be switched on when the magnetic head 103 has accessed the innermost track on the magnetic disk 101; a PG pulse generator 108 including a PG coil for generating one pulse signal per revolution of the magnetic disk 101; a motor driver 109 for driving the DC motor 102; a servo circuit 110 responsive to an output signal from the PG pulse generator 108 for controlling the DC motor driver 109 to rotate the magnetic disk 101 at a fixed speed; a reproducing amplifier 111 for amplifying an output signal from the magnetic disk 103; a frequency demodulation circuit 112 for demodulating a frequency-modulated signal output from the reproducing amplifier 111; a video signal processing circuit 113 for receiving the output signal demodulated by the frequency demodulation circuit 112 and outputting the corresponding video signal; and an image mute circuit 114 operated in response to a control signal supplied from a system controller 123 which will be described later, the image mute circuit 114 being operated to mute video outputs to a monitor 115.

The second embodiment further includes an audio signal input processing circuit 116 for executing a processing for limiting the amplitude and bandwidth of an audio signal which is input through a microphone connected to a sound input terminal AIN, externally connected equipment (not shown) and so forth; an A/D conversion circuit 117 for converting analog audio signals output from the audio signal processing circuit 116 into digital signals; a memory 118 for storing therein the audio signals which have been converted into digital form by the A/D conversion circuit 117; a D/A conversion circuit 119 for converting digital signals read from the memory 118 into analog signals; and a main controller 122 for controlling the operation timings and read/write operations of the A/D conversion circuit 117, the memory 118 and the D/A conversion circuit 119 in accordance with instructions supplied from the system controller 123, the main controller 122 capable of effecting compression and expansion of the time axis of digital signals stored in the memory 118 by changing speeds at which the main controller 122 reads out the digital signals from the memory 118. Therefore, the recording and reproducing apparatus according to the second embodiment perform processings so that signals are recorded on the magnetic disk with their time axis compressed and the compressed signals are reproduced in an expanded form to reproduce the actual time period it took to record the signals.

The audio signals which have been reconverted into analog signals having a compressed time axis by the D/A conversion circuit 119 are input to the audio signal recording/processing circuit 120, then output from the system controller 123. If the time-axis compression ratio of the audio signals, the video signal track numbers corresponding to the audio signals, and the audio signals are recorded over a plurality of tracks, information such as control codes indicative of the start track number and the succeeding track number is added to the above noted information. The added information, after frequency modulation, is input to the recording amplifier 121. Outputs from the recording amplifier 121 are supplied to the magnetic head 103 through a terminal A of a switch SW$_1$ for selecting recording or reproduction, and are recorded on the magnetic disk 101.

The memory controller 122, as described previously, provides control over the operating timings and read/write operations of the A/D conversion circuit 117, the memory 118, and the D/A conversion circuit 119 as well as address signals of the memory 118 in accordance with the timing provided by the PG signal generator 108 and in response to control signals from the system controller 123. The memory controller 122, at its own operation timing, delivers to the system controller 123 addition timings at which information signals are added to audio signals.

The system controller 123 for providing control over the entire system is connected to an external ROM 124 in which programs are stored, and includes a CPU capable of providing various kinds of control in accordance with programs. The system controller 123 is further connected to an external RAM 125 so that the system controller 123 can temporarily store a program required for selected control in the RAM 125 or read it from the RAM 125.

A disk sensing mechanism 126 is constituted by a phototransistor 126a and a light emitting diode 126b for sensing the presence or absence of the magnetic disk 101. The disk sensing mechanism 126 senses the presence of the magnetic disk 101 between the phototransistor 126a and the light emitting diode 126b, and supplies the detection outputs to the system controller 123.

An envelope detecting circuit 127 compares the level of frequency-modulated reproduced signals output from the reproducing amplifier 111 with a predetermined reference level to determine whether or not the tracks on the magnetic disk 101 are recorded. The information representing the result of this determination is output to the system controller 123.

As described previously, the switch SW$_1$ is a recording/reproduction selector switch which is arranged such that when a switching element is switched to the terminal A, the magnetic head 103 is connected to the recording amplifier 121 to assume the record mode while when the switching element is switched to the terminal B, the magnetic head 103 is connected to the reproducing amplifier to assume the reproduce mode. The switching of the switch SW$_1$ is performed by the system controller 123.

The following is a description of switches connected to the system controller 123. A switch SW$_2$ is a switch for selecting an automatic audio signal recording mode which will be described later. A switch SW$_3$ is an UP switch for causing the magnetic head 103 to be moved radially inwardly over the magnetic disk 101, that is, in the direction in which the track numbers ascend. A switch SW$_4$ is a DOWN switch for causing the magnetic head 103 to be reversed radially outwardly over the magnetic disk 101. A switch SW$_5$ is a sound recording start switch for starting recording audio signals. A switch SW$_6$ is a program switch which is used for programming the track number accessed by the magnetic head 103 during operation of the switch SW$_6$ and storing the programmed track number in the RAM 125. The switch SW$_6$ will be described in detail later. A sound compression mode selector switch 128 can be operated to select a desired time-axis compression ratio of input audio signals, that is, a recording period and select the corresponding mode. Three time-axis compression ratios of 320 times, 640 times and 1280 times (in the NTSC system) are prepared, and respectively are about 5, 10, and 20 seconds in terms of the actual recording period for one track.

The recording and reproducing apparatus according to the second embodiment is arranged as described above. The operation of the aforesaid recording and reproducing apparatus will be described below with reference to the flow charts shown in several figures.

Figure 5:
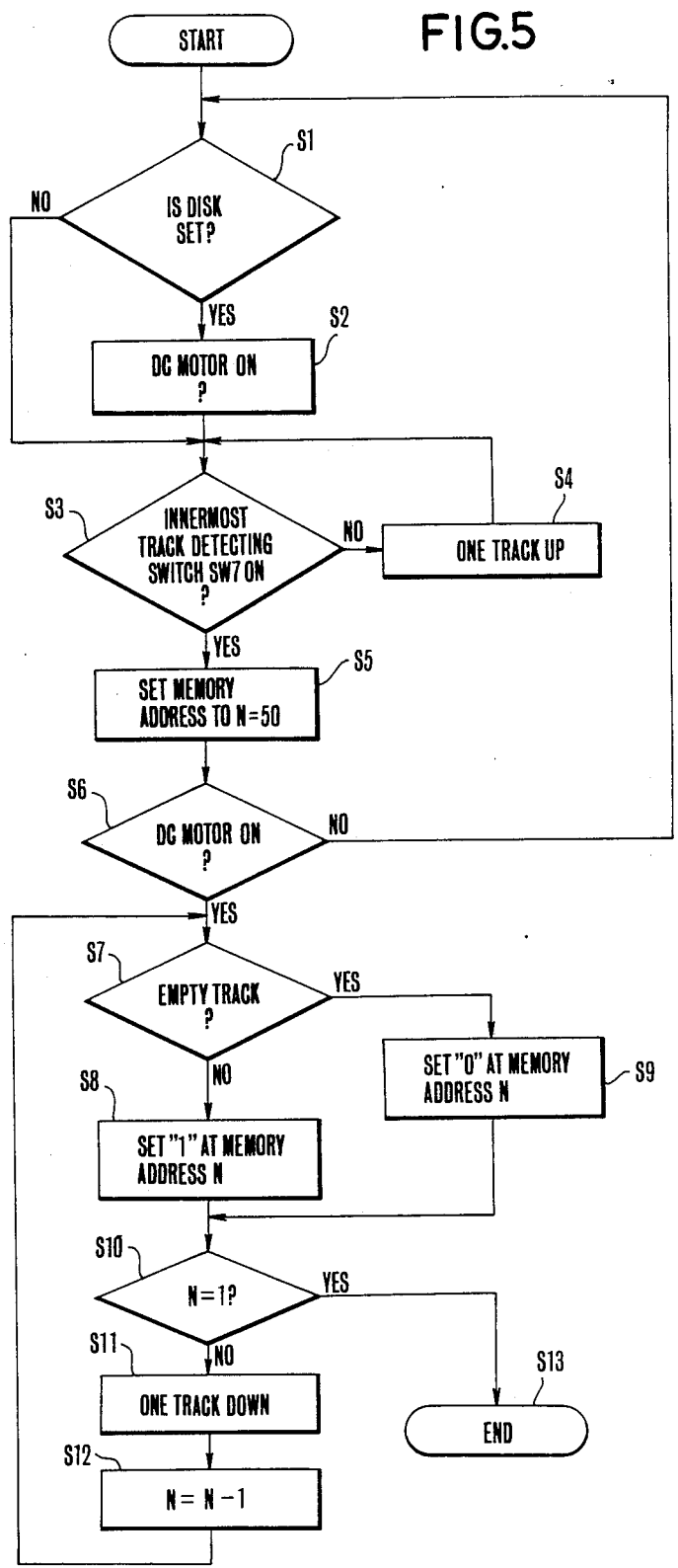
FIG. 5 is a flow chart illustrating the initializing operation executed in the apparatus shown in FIG. 4.

FIG. 5 is a flow chart illustrating the initializing operation of the present recording and reproducing apparatus.

When a power switch (not shown) is turned on, electric power is supplied to the system and the system controller 123 is reset and initialized. At this point in time, the image mute circuit 114 is initialized so as to mute video signals supplied to the monitor 115. Thus, it is possible to prevent unwanted information or noise from being output to the monitor 115.

After the above initialization has been completed, the process proceeds to Step S1 in which the system controller 123 reads outputs from the magnetic disk sensing mechanism 126 to determine whether or not the magnetic disk 101 is set. If the magnetic disk 101 has been set, the process proceeds to Step S2 in which the servo circuit 110 is controlled in accordance with the command of the system controller 123 to actuate the DC motor 102 through the DC motor driver 109 thereby rotating the magnetic disk 101 at a fixed speed (3600 r.p.m.). Subsequently, the process proceeds to Step S3.

In Step S3, the system controller 123 reads outputs from the innermost track sensing switch 107 to determine whether or not the magnetic head 103 has accessed the innermost track on the magnetic disk 101 (for example, the 50th track on a still video floppy disk). If the innermost track sensing switch 107 is ON, the process proceeds to Step S5, while if it is OFF, the process proceeds to Step S4. In Step S4, the magnetic head 103 is moved radially inwardly by one track, and the process returns to Step S3 in which judgment is made with respect to whether or not the relevant track is the innermost one. The movement of the magnetic head 103 is performed by controlling the motor driver 106 by means of the system controller 123, driving the head driving motor 105, and operating the head movement mechanism 104. In other words, Steps S3 and S4 are repeated until the magnetic head 103 has accessed the innermost track (the 50th track). When the magnetic head 103 reaches the position of the innermost track, the process proceeds to Step S5 in which "50", the track number of the innermost track, is set in a parameter N for setting an address in the RAM 125. This data in itself is a parameter indicative of a track position.

In Step S6, judgment is made with respect to whether the DC motor 102 for rotating the magnetic disk 101 is ON or OFF. If the DC motor 102 is ON, that is, rotating, the process proceeds to Step S7, while if the DC motor 102 is not rotated in the OFF state, the process returns to Step S1. More specifically, if the process proceeds to Step S7, this indicates that the DC motor 102 is turned on in Step S2 and that the magnetic disk 101 have been set. On the other hand, if it is judged in Step S1 that the magnetic disk 101 has not yet been set, the process jumps to Step S3 and therefore the DC motor 102 is not actuated. In this case, the magnetic head H is moved to the innermost 50th track, and the process returns to Step S1.

In Step S7, on the basis of the level of the signal reproduced from the relevant track, the envelope detecting circuit 127 determines whether that track is a recorded track or a non-recorded track, and the result of this determination is read in the system controller 123. If the accessed track is not an empty track, the process proceeds to Step S8, while if it is an empty track, the process proceeds to Step S9.

In Step S8, data indicative of a recorded track, for example, "1" is set at address N of the RAM 125. If the process proceeds to Step S9, data indicative of an empty (non-recorded) track, for example, "0" is set at address N of the RAM 125. Thus, information representative of whether the track No. N is a recorded or empty track is set at address N of the RAM 125.

In Step S10, judgment is made with respect to whether or not the content of address N corresponding to the relevant track number is "1". If N≠1, the process proceeds to Step S11 in which the magnetic head 103 is moved radially outwardly over the magnetic disk 101, that is, in the direction in which track numbers descend. Subsequently, the above-described operation is repeated. On the other hand, if it is determined in Step S10 that N=1, this indicates that all the information on the innermost 50th track to the outermost 1st track has been written into the RAM 125. Therefore, the process proceeds to Step S13 and completes this flow.

The foregoing is a description of the initialization operation of the present recording and reproducing apparatus. In this fashion, data required for information management such as track addresses and the state of use of each track on the magnetic disk 101 is stored in the RAM 125. Thereafter, various control operations are executed with reference to data stored in the RAM 125.

The following is a description of a method of reproducing video signals as a visual image.

After the initialization flow shown in FIG. 5 has been completed (in this example, N=1), judgment is made with respect to whether or not an Nth track is recorded. If the Nth track is recorded, the magnetic head H is stopped at this Nth track. If the Nth track is not a recorded track, judgment is made, by referring to the contents of the RAM 125, with respect to whether or not data set at address N+1 of the RAM 125 represents a recorded track. In this manner, a recorded track is searched for from the outermost side, and when the outermost recorded track is detected, the magnetic head 103 is moved to that track and stopped at the track. Video signals reproduced by the magnetic head 103 are input to the reproducing amplifier 111 through a terminal B of the recording/reproduction selector switch SW$_1$, followed by frequency modulation in the frequency modulation circuit 112. Then, in the video signal processing circuit 113, the frequency-modulated signals are processed into video signals of a format suitable for reproduction of an visual image, and are supplied to the monitor 115 through the image mute circuit 114. During this time, since the image mute circuit 114 is set in the non-mute state by the system controller 123, an operator can visually confirm the image on the monitor 115.

After the magnetic disk 101 has been set in the above-described manner, an image on the outermost image track is reproduced. By way of example, the above description has referred to the setting of the magnetic disk 101 on which only video signals are recorded. Therefore, reproduction is effected by determining whether or not signals recorded on a recorded track are video signals. However, output signals from the video signal processing circuit 113 may be input to the system controller 123 in which judgment is made with respect to the presence or absence of synchronizing signals, and judgment may be made with respect to whether the signals are video signals or audio signals or data signals. Only when it is determined that the signals are video signals, movement of the magnetic head 103 may be stopped and the mute state may be released.

The following is a description of a so-called after recording operation of recording audio signals whose time axis are compressed at a predetermined time-axis compression ratio on an empty track on the magnetic disk 101 having tracks on which video signals have already been recorded.

A recording format for audio signals will be described in brief.

Figure 6A:
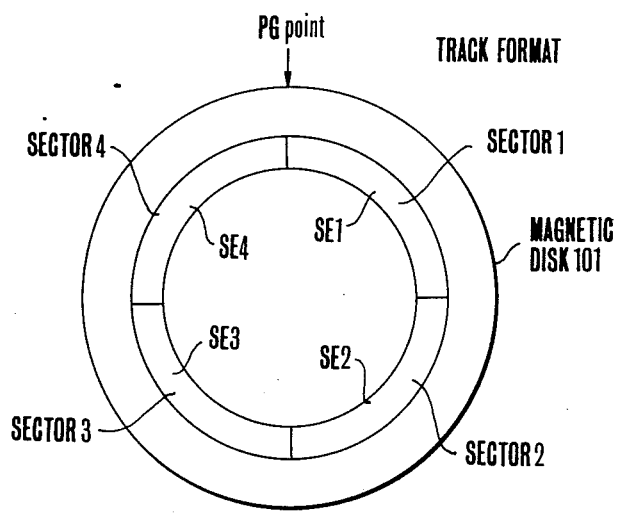
FIG. 6(a) is a schematic view illustrating a track format of a recording medium used with the present invention.
Figure 6B:
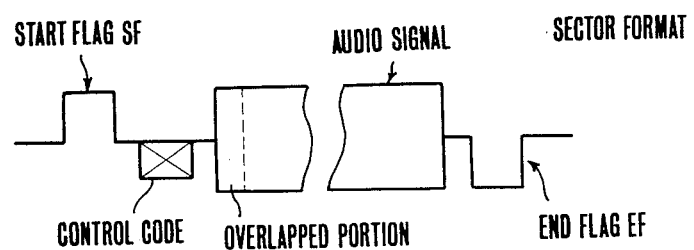
FIG. 6(b) is a schematic view illustrating a sector format in the track format shown in FIG. 6(a)

FIG. 6(a) shows one of sound tracks on tracks formed on the magnetic disk 101. Each of the sound tracks is divided into four sectors SE1 to SE4, and the format of each of the sectors SE1 to SE4 is as shown in FIG. 6(b). A start flag SF which is a start signal indicative of the start of a sound sector is recorded at the start position of each of the sectors SE1 to SE4. If control codes representative of the time-axis compression ratio of audio signals and a video signal track address corresponding to the audio signals, as well as the audio signals are recorded continuously over a plurality of tracks, the track number at which sound recording is started and a track number at which the ensuing audio signals are recorded are recorded as control codes for reproduction of the sound tracks. If audio signals are recorded over a plurality of tracks, these audio signals may be regarded as one set. Such one set is hereinafter referred to as "one sequence" of sound. In another case where audio signals are completely recorded on a single track, this state is also hereinafter referred to as "one sequence".

The following is a description of sound recording operation.

Recording of audio signals is started by turning on the audio signal start switch SW5 shown in FIG. 4. When the switch SW5 is turned on, audio signals input through the audio signal input terminal AIN are subjected to amplitude or bandwidth limitation in the audio signal input processing terminal 116 to be processed into signals suitable for input to the A/D conversion circuit 117. The A/D conversion circuit 117 converts the sound analog input signals to digital signals, and supplies the digital signals to the memory 118. Thus, after such analog-to-digital conversion, the input audio signals (of duration equivalent to a recording period) are written into the memory 118. When the system controller 123 detects the fact that the sound recording start switch SW5 has been turned on, the system controller 123 reads the presently selected state of the mode selector switch 128 for selecting one from the sound compression modes each corresponding to a different time-axis compression ratio and outputs control signals to the memory controller 122. Thus, the system controller 123 provides control over the above-described A/D conversion and data writing into the memory 118 on the basis of clock signals at a speed matching the selected sound compression mode. In addition, the system controller 123 counts the maximum allowable recording period per track on the basis of the state of the sound compression mode selector switch 128.

When the maximum allowable recording period per track has elapsed since the starting of writing of audio signals into the memory 118, the system controller 123 controls the memory controller 122 to read data from the memory 118, and then controls the D/A conversion circuit 119 to read out the thus-read audio signals at a speed corresponding to the selected time-axis compression ratio. The output signals from the D/A conversion circuit 119 are input to the audio signal recording processing circuit 120, and, at the same time, the previously-described sound control code is input from the system controller 123 to the same circuit 120. These input signals are processed into signals according to a sound format such as the one represented in FIG. 6(b), followed by frequency modulation. Subsequently, audio signals whose time axis have been compressed in accordance with the selected time-axis compression ratio are recorded on a particular track by the magnetic head 103 through the recording amplifier 121 and the recording-/reproduction selector switch SW1 (in the recording mode, the movable element is switched to the terminal A by the system controller 123.)

When audio signals are to be actually read from the memory 118, the memory controller 122 starts its operation in response to a PG signal output from the PG generator 108. Therefore, audio signals can be recorded on the respective sectors of each of the tracks with reference to the PG signal.

The following is a description of a so-called after recording of recording audio signals whose time axis is compressed on an empty track on the magnetic disk 101 having tracks on which video signals have already been recorded.

Figure 7:
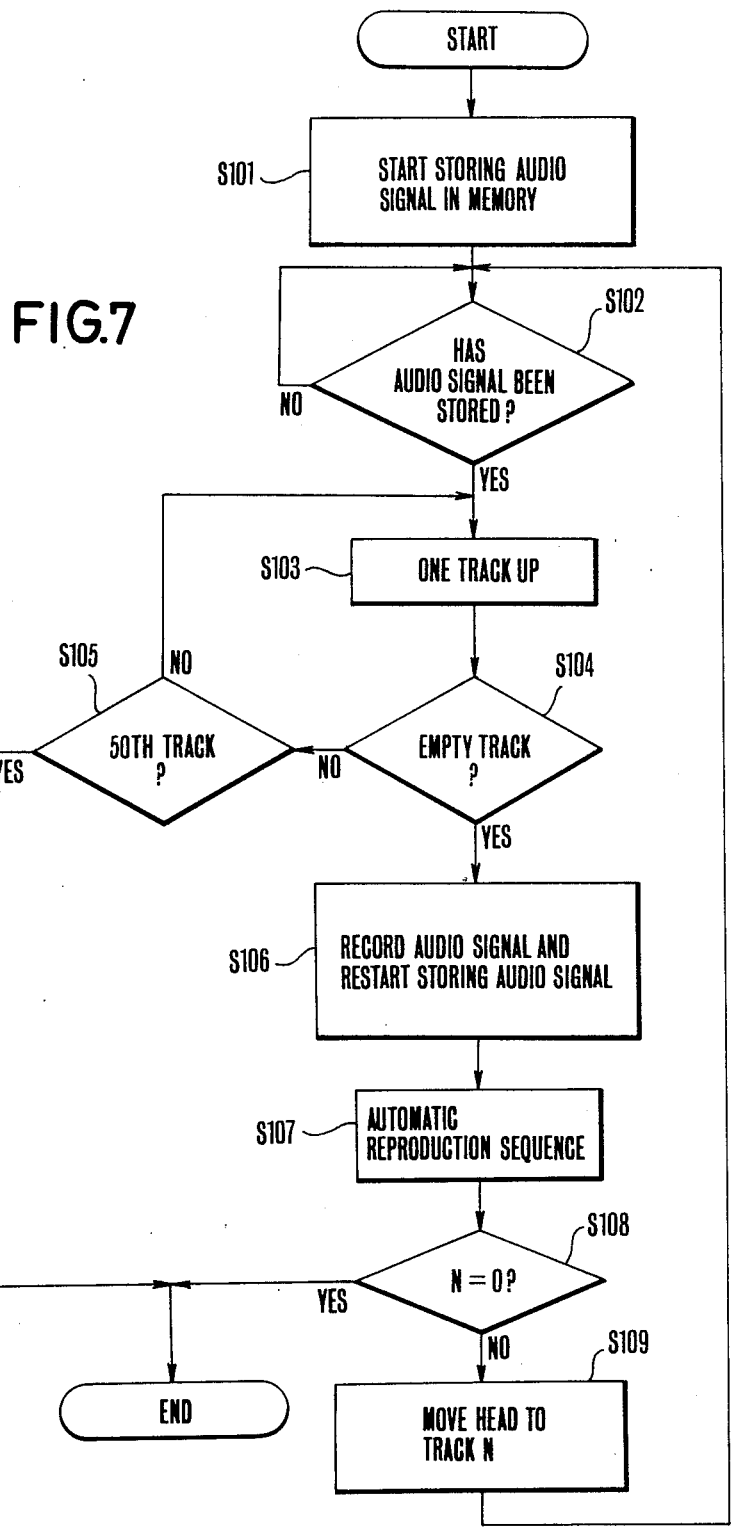
FIG. 7 is a flow chart illustrating an after recording operation executed in the second embodiment.

FIG. 7 is a flow chart showing such an after recording operation. The operation realized by this flow chart are such that video signal tracks to be reproduced is automatically changed each time the recording period for audio signals per track has elapsed and, at the same time, audio signals are recorded on an empty track on the magnetic disk 101.

After the initializing flow shown in FIG. 5, a desired video signal track is accessed by operating the UP switch SW3 and the DOWN switch SW4 for switching tracks. The subsequent operation is performed in accordance with the flow chart shown in FIG. 7 by turning on the sound recording start switch SW5.

When the sound recording start switch SW5 is turned on, the process proceeds to Step S101 in the flow chart shown in FIG. 7. In Step S101, the storing of audio signals in the memory 118 is started at a speed according to the time-axis compression mode for audio signals. In Step S102, the CPU in the system controller 123 controls the time period required for audio signals to be stored and determines whether or not the operation of storing the audio signals has been completed. When the storing of the audio signals has been completed, the process proceeds to Step S103 in which the magnetic head 103 is moved radially inwardly by one track, that is, in the direction in which track numbers are incremented. In Step S104, judgment is made with respect to whether or not the track which has been newly accessed by the magnetic 103 is an empty track. If the track is not an empty track, the process proceeds to Step S105 in which judgment is made with respect to whether or not the presently accessed track is the innermost track, that is, the 50th track. If it is determined in Step S105 that the final 50th track is accessed, the sound recording mode is completed, while if the final track is not accessed, the process returns to Step S103 in which the magnetic head 103 is further moved radially inwardly by one track. The above operation is repeated until an empty track is detected in Step S104 or until the final track is reached in Steps S104 and S105.

If it is determined in Step S106 that the presently accessed track is an empty track, the flow process to Step S106 in which sound recording is performed. This recording operation is executed by reading the corresponding audio signals from the sound memory 118. At this time, an address N (to be described later), that is, the track address of the video signals which was precedingly reproduced is added as information relative to the corresponding video track address, and the address N together with the sound signals are recorded. Thus, it is registered which image track corresponds to the recorded audio signals. When the recording of the audio signals is completed, storing of audio signals is restarted.

In Step S107, a process flow for automatic reproduction sequence is executed, and the process proceeds to Step S108. After the automatic reproduction sequence of Step S107 which will be described later has been completed, the process proceeds to Step S108 in which the next video signal track to be reproduced is set in a parameter N on the memory 118. In Step S108, judgment is made with respect to whether or not the above parameter N is "0". If it is determined that the parameter is "0", the program flow shown in FIG. 7 is ended. If it is not "0", the magnetic head 103 is moved to track N. Then, the process returns to Step S102 and the above-described operation is repeated.

In the present embodiment, as the audio signal recording period for each track elapses, the magnetic head 103 is moved to the ensuing video signal track, and the audio signals read from the memory 118 together with control data representative of the track address of the video signal track which was precedingly reproduced are recorded on an empty track. This operation is repeated to complete after recording.

The automatic reproduction sequence of Step S107 in the flow chart shown in FIG. 7 will be described below with reference to FIGS. 8 to 11. The automatic reproduction sequence functions to provide control over the sequence of reproduction of video signals.

Figure 8:
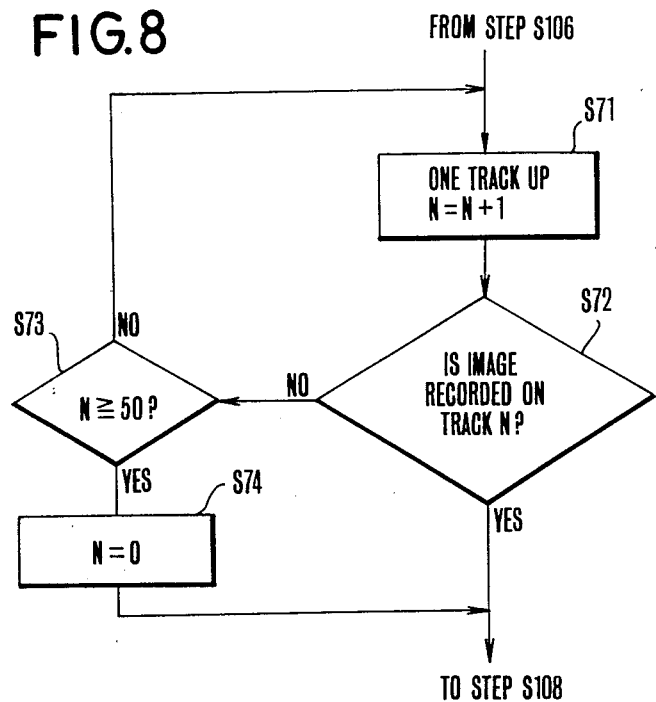
FIG. 8 is a flow chart illustrating a first example of a reproduction sequence for video signal tracks in the flow chart shown in FIG. 7.

FIG. 8 shows an example of the flow chart for sequentially reproducing only video signal tracks while automatically moving the magnetic head 103 radially outwardly over the tracks on the magnetic disk 101.

As illustrated, Step S107 is constituted by Steps S71, S72, S73, and S74, and, after audio-signal recording has been performed in Step S106 of the flow chart shown in FIG. 7, the process proceeds to Step S71 in which the automatic reproduction sequence starts. In Step S71, the magnetic head 103 is moved radially inwardly by one track, and "1" is added to the value of the memory parameter N indicative of a video signal track number, and the process proceeds to Step S72. In Step S72, judgment is made with respect to whether or not the track which is being reproduced is a recorded track. If it is not a recorded track, the flow proceeds to Step S73 in which judgment is made with respect to whether or not N has reached a value corresponding to the final track, that is, 50 or greater. If N is 50 or greater, that is, the magnetic head 103 has reached the innermost 50th track, the process proceeds to Step S74 in which "0" is set in the memory parameter N, and then returns to Step S108 of the flow chart shown in FIG. 7. If it is determined in Step S73 that N is less than 50, the process returns to Step S71 and the above operation is repeated. Specifically, Steps S71 to S74 are repeated and thus the magnetic head 103 is moved to the video-signal recorded track which is inward of and nearest to the image track which was accessed prior to the execution of Step S71, and the process proceeds to Step S108. If there is no video signal track between the relevant video signal track and the 50th track, the parameter N is set to N=0, and the process proceeds to Step S108.

In the process subsequent to Step S108, if N≠0, the magnetic head 103 is moved to the track addressed indicated by the value of N; when N=0, the flow is completed. In the latter case, since the magnetic head 103 has previously been moved to the Nth track in Step S71, it is not necessary to move the magnetic head 103 to the Nth track in Step S109. However, in a second example of the automatic reproduction sequence which will be described later, it is impossible to omit Step S109.

The second example of the automatic reproduction sequence will be described below with reference to FIGS. 9, 10 and 11. In the second example, video signals are automatically reproduced in an arbitrary order. Prior to the execution of operation in the second example, it is required that the order of the video signal tracks to be reproduced be programmed and stored in the RAM 125. First of all, a programming method will be described below.

Figure 10:
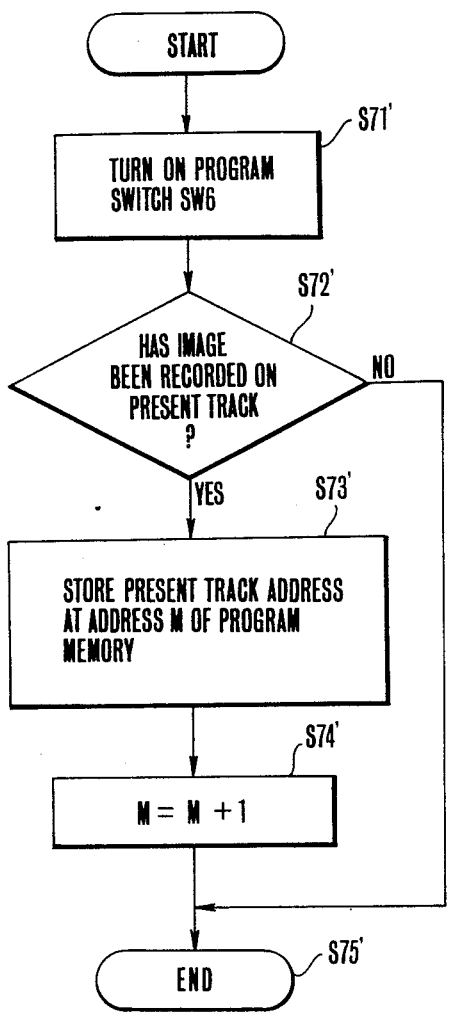
FIG. 10 is a flow chart illustrating the operation of presetting a program for reproducing video signal tracks.

Referring to the flow chart shown in FIG. 10, when the program switch $SW_6$ shown in FIG. 1 is turned on, the track address of the video signal track which is then being accessed is programmed and stored in the RAM 125. More specifically, the operator reproduces video signal tracks from the magnetic disk 101 and stores their track addresses in the RAM 125 in the desired after recording order by throwing the program switch $SW_6$. Thus, the operator can arbitrarily determine the order of reproduction of the video signal tracks.

When the program switch $SW_6$ is turned on in Step S71', the process proceeds to Step S72' in which judgment is made with respect to whether or not the track which is then being accessed is a track containing a recorded video signal. If this track is not a recorded track, the process proceeds to Step S75' whereby the flow is completed. If it is determined in Step S72' that the track which is then being accessed is a recorded track, the process proceeds to Step S73' in which the track address of the track which is presently accessed is stored at address M in program memory in the RAM 125 shown in FIG. 11. After the value at address M of the program memory in Step S74' has been incremented by one, the process proceeds to Step S75', and the flow is completed. In this fashion, each time the track number of a video signal track which is then accessed is stored in program memory, the address in program memory is updated. Therefore, each time the operator selects a desired video signal track, he may store the corresponding track address in the RAM 125.

It is to be noted that, when a power supply is turned on or when a video floppy disk is loaded, the program memory address M is preset to "0" and, at the same time, the contents of program memory are also reset to "0". As explained previously, each time the program switch $SW_6$ is turned on, a selected track number is stored in program memory and the value of the address M is incremented by one. In other words, the magnetic head 103 is moved over the video signal tracks by operating the UP and DOWN switches $SW_3$ and $SW_4$, and, if the program switch $SW_6$ is turned on each time a desired image is selected during the movement of the magnetic head 103, an arbitrary reproduction order for the video signal tracks can be programmed irrespective of whether the order of track addresses is ascending or descending.

Figure 9:
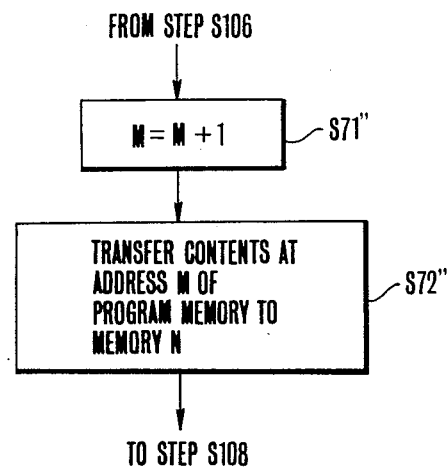
FIG. 9 is a flow chart illustrating a second example of a reproduction sequence for video signal tracks in the flow chart shown in FIG. 7.

FIG. 9 is a flow chart of automatic reproduction using a program stored in the above-described manner. In this flow, the track addresses of video signals to be reproduced which are formed in program memory are stored in a table, and automatic reproduction is performed in accordance with the program (reproduction order) thus stored in the table. The flow chart shown in FIG. 9 shows the contents of Step S107.

When the sound recording start switch $SW_5$ is turned on, the magnetic head 103 is moved to an initial programmed track address. This movement is implemented by placing "0" at address M in program memory, reading out the track address stored at address M (that is, track address 0) of the program memory, and moving the magnetic head 103 to that track address. Then, the process proceeds to Step S101 of the flow chart shown in FIG. 7, and the previously-described operation sequence is executed. After Step S106 has been executed, the process enters the automatic reproduction sequence based on the programmed reproduction illustrated in the flow chart of FIG. 9.

In Step S71" shown in FIG. 9, the address M in program memory is incremented by one and, in Step S71', the track address stored at the thus-incremented address M is transferred to memory address N, that is, the track address of the video signals to be reproduced next is stored at memory address N. Then, the process proceeds to Step S108 in which the magnetic head 103 is moved to track No. N, and the process flow shown in FIG. 7 is repeated (refer to FIG. 9 for Step S107) in order to record audio signals while the image tracks to be reproduced are being switched in the programmed order.

In the flow chart shown in FIG. 7, an empty track on which audio signals are to be recorded is searched for only while the magnetic head moves radially inwardly over the video floppy disk (see Steps S103 and S104). However, the search may also be performed while the magnetic head moves radially outwardly over the video floppy disk, whereby it is possible to prevent audio-signal recording from being completed with an empty track left over on the video floppy disk.

Furthermore, in Step S101 and S102 of FIG. 7, prior to beginning the storing of the audio signals, judgment may be made, by referring to the contents of the RAM 125, with respect to whether or not any empty tracks remain on the video floppy disk; the audio-signal recording sequence may then be completed if there are no empty tracks. This arrangement makes it possible to determine, prior to beginning of the storing of audio signals, whether or not recording is enabled. It is therefore possible to prevent the occurrence of malfunction and to improve the operability of the recording and reproducing apparatus.

Figure 12:
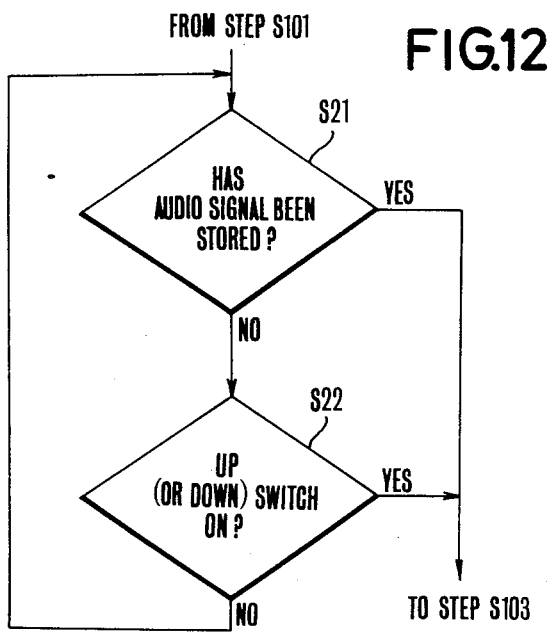
FIG. 12 is a fragmentary view of a flow chart illustrating the function of terminating the storing of audio signals before a predetermined recording period elapses.

The following is a description of the flow chart shown in FIG. 12, in which a video signal track which is being reproduced is changed to another video signal track before the period required for information to be recorded on one track elapses. This operation can be implemented by substituting Steps S21 and S22 of FIG. 12 for Step S102 in the flow chart shown in FIG. 7.

Referring back to the flow chart shown in FIG. 7, Step S102 is repeated until it is confirmed that the storing of the audio signals has ended. In the flow chart shown in FIG. 12, Step S102 is altered as follows.

If it is determined in Step S21 that the storing of audio signals has ended, the process proceeds to Step S103, and the same sequence as that shown in FIG. 7 is performed. If it is determined in Step S21 that the storing of audio signals has not yet ended, the process proceeds to Step S22, in which judgment is made with respect to whether or not the UP switch $SW_3$ shown in FIG. 4 has been turned on. If the UP switch $SW_3$ has not been turned on, the process returns to Step S21, in which judgment is made with respect to whether or not the storing of audio signals has ended. If the UP switch $SW_3$ has been turned on, the process proceeds immediately to Step S103 and enters the same sequence as the one performed when the storing of audio signals has ended. Accordingly, if the storing of audio signals has not been ended, it can be terminated at any time by throwing the UP switch $SW_6$ to return the process to Step S103. In Step S103, audio signal data stored in the memory 118 is recorded on an empty track, and the magnetic head 103 is moved to a video signal track determined by the automatic reproduction sequence of Step S107, so that the desired video signals are reproduced. Then, the process returns to Step S21, and the above-described flow is repeated. Thus, the updating of video signals for reproduction can be done irrespective of the time elapsed since the storing of audio signals began, by throwing the UP switch $SW_3$. In the above example, the UP switch $SW_3$ is thrown to forcibly update video signals for reproduction. However, the DOWN switch $SW_4$ may be used in place of the UP switch $SW_3$. In other words, video signal tracks may be changed by using instructions for changing the tracks as interrupt signals.

The following is a description of a modification in which audio signals can be recorded over at least two tracks that correspond to a single track of video signals.

Figure 13:
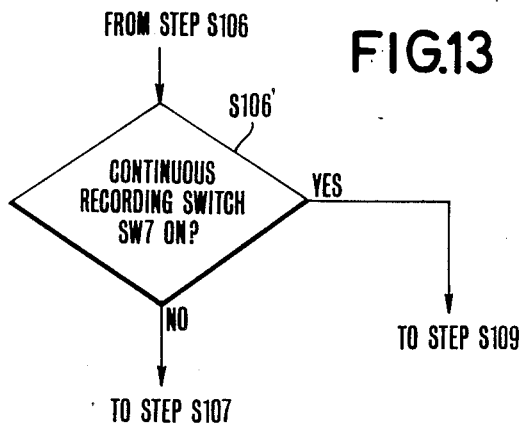
FIG. 13 is a fragmentary view of a flow chart illustrating the function of recording audio signals over a plurality of tracks.

This modification makes it possible to record audio signals of extended duration for a single track of video signals. More specifically, this modification can be achieve by inserting Step 106' of the flow chart shown in FIG. 13 between Steps S106 and S107 in the flow chart shown in FIG. 7. In Step S106 of the flow chart shown in FIG. 7, audio signal data in the memory 118 is recorded on an empty track on the magnetic disk 101 and the storing of the next audio signals is started. Then, the process proceeds to Step 106' shown in FIG. 13, in which judgment is made with respect to whether or not the continuous recording switch $SW_7$ shown in FIG. 4(b) has been turned on. If the switch $SW_7$ is not turned on, the process proceeds to Step S107, and enters the automatic reproduction sequence as described previously, and the presently accessed track is switched to a predetermined video signal track. If the switch $SW_7$ is ON, the process jumps over the automatic reproduction sequence of Step S107 to Step S109 in which the magnetic head 103 is moved to the track address N of the video signals which has so far been reproduced, and reproduction of the same video signal track is performed. Thus, it is possible to record audio signals for an extended period without the need to change video signal tracks.

It is to be noted that, in any of the above-described embodiment and the modifications thereof, if the memory 118 for storing therein audio signals is provided with a capacity equivalent to the maximum period of sound to be recorded on one track and a memory capacity equivalent to the maximum period between the moment at which a sound recording track is accessed and the moment at which sound is recorded on the sound recording track, it is possible to perform sound recording without the need to interrupt the storing of audio signals in the memory and hence to record continuous audio signals.

As described above, in the recording and reproducing apparatus according to the aforesaid embodiment, when audio signals are to be recorded on an empty track on a recording medium including recorded video signal tracks, that is, when a so-called after recording operation is to be performed, video signal tracks for reproduction can be automatically changed in accordance with the passage of the recording period for audio signals to thereby access the video signal track to be next reproduced. Accordingly, when after recording is being performed with a particular video signal track being reproduced, the timing between the start and stop of video signal recording and the switching of video signal tracks can be positively assured. Since an operator needs only to perform the operation of storing audio signals while video signals are being reproduced, high-quality recording can be achieved with a simplified operation.

In addition, even before the storing of audio signals has been completed, it is possible, at any time, to interrupt the storing of audio signals and change video signal tracks. Furthermore, after audio signals of duration equivalent to a predetermined recording time (one track) have been completed, audio signals can be recorded over a plurality of tracks without the need to change the video signal track which is being accessed. In this case as well, the timing between the recording of audio signals and the reproduction/switching of video signals is positively assured. Accordingly, it will be understood that the above-described embodiment and the modifications thereof provide great effects.

By way of example, in the above-described embodiment and the modifications thereof, video signals representative of a still image are used as information signals, and audio signals of predetermined duration to be reproduced together with the video signals are used as additional information signals to be reproduced together with the information signals, as well as a storage means for storing both of the signals is a video floppy disk on which the audio and video signals can be recorded in a mixed form in accord with the still video standard. However, the present invention is not limited solely to the above-described ones, and various modifications and alternatives are enabled without departing from the scope and spirit of the appended claims. For instance, the storage means may be a tape-like recording medium or a card-like recording medium or a solid state memory such as a semiconductor memory or a Bloch line memory.

What is claimed is:

1. A recording apparatus for recording information signals and corresponding additional signals to be reproduced together with said information signals, on storage means in a positionally mixed form, comprising:
   (a) recording means for recording said additional signals on said storage means; and
   (b) reproducing means for reproducing from said storage means information signals corresponding to said additional signals in advance of the recording of said additional signals by said recording means.

2. The apparatus according to claim 1, wherein said information signals are video signals.

3. The apparatus according to claim 1, wherein said additional signals are audio signals.

4. The apparatus according to claim 1, wherein said storage means is a recording disk.

5. The apparatus according to claim 2, further comprising a monitor and means for supplying information signals reproduced by said reproducing means to said monitor so as to reproduce said information signals as a visual image.

6. The apparatus according to claim 3, wherein said recording means includes means for providing said audio signals in time axis compressed form for recordation.

7. A recording apparatus for effecting recording on storage means on which video signals and audio signals can be recorded over a plurality of blocks in a positionally mixed form, comprising:
   (a) reproducing means for reproducing from said storage means blocks on which video signals are recorded;
   (b) recording means for recording audio signals in a predetermined block on said storage means; and
   (c) changing means for changing blocks, in which are recorded said video signals to be reproduced by said reproducing means, on the basis of the passage of a recording period required for said audio signals to be recorded by said recording means.

8. The apparatus according to claim 7, wherein said storage means is a recording disk.

9. The apparatus according to claim 8, wherein said blocks are concentric tracks formed on said recording disk.

10. The apparatus according to claim 7, wherein said recording means includes:
    (a) compressing means for compressing the time axis of incoming audio signals of predetermined duration so that said incoming audio signals can be recorded in a single block on said storage means; and
    (b) means for effecting recording on said storage means of said audio signals whose time axis is compressed by said compressing means.

11. The apparatus according to claim 10, wherein said changing means is operable, when said predetermined duration elapses, to change blocks, in which are recorded video signals, to be reproduced by said reproducing means.

12. The apparatus according to claim 7, further comprising storing means for storing a block reproduction order subject to be changed by said changing means, said changing means being operable to change the reproduction of said blocks in which are recorded said video signals to be reproduced in accordance with such changed order stored in said storing means.

13. A recording apparatus for effecting recording on storage means on which video signals and audio signals can be recorded over a plurality of blocks in positionally mixed form, comprising:
    (a) reproducing means for reproducing from said storage means blocks on which video signals are recorded;

(b) recording means for temporarily holding audio signals of predetermined duration and storing said audio signals in a predetermined block on said storage means;

(c) first changing means for changing blocks to be reproduced by said reproducing means on the basis of the passage of the predetermined duration of said audio signals; and (d) second changing means for controlling the changing of said blocks to be reproduced in preference to said first changing means.

14. The apparatus according to claim 13, wherein said second changing means is operable for forcibly changing from a block which is being reproduced to another block before the elapse of the predetermined duration of said audio signals.

15. The apparatus according to claim 14, further comprising instruction means for providing instructions for the changing of blocks, in which are recorded video signals, to be reproduced by said reproducing means, wherein said second changing means changes from a block which is being reproduced to another block in accordance with the instruction provided by said instruction means.

16. The apparatus according to claim 13, wherein said recording means records on said storage means said audio signals which are temporarily held by said recording means in correspondence with the changing of a block which is being reproduced by one of said first changing means and said second changing means.

17. The apparatus according to claim 13, wherein said storage means is a recording disk.

18. The apparatus according to claim 13, further comprising a monitor and means for supplying video signals reproduced by said reproducing means to said monitor so as to reproduce said video signals as a visual image.

19. The apparatus according to claim 13, wherein said predetermined block is an unrecorded block.

* * * * *